United States Patent
Yuen

(10) Patent No.: US 10,282,448 B2
(45) Date of Patent: May 7, 2019

(54) SYSTEM AND METHOD FOR SEARCHING A SYMMETRICALLY ENCRYPTED DATABASE FOR CONJUNCTIVE KEYWORDS

(71) Applicant: HUAWEI INTERNATIONAL PTE. LTD., Singapore (SG)

(72) Inventor: Tsz Hon Yuen, Singapore (SG)

(73) Assignee: HUAWEI INTERNATIONAL PTE. LTD., Singapore (SG)

( * ) Notice: Subject to any disclaimer, the term of this patent is extended or adjusted under 35 U.S.C. 154(b) by 579 days.

(21) Appl. No.: 14/921,337

(22) Filed: Oct. 23, 2015

(65) Prior Publication Data
US 2016/0140179 A1    May 19, 2016

(30) Foreign Application Priority Data
Nov. 18, 2014  (SG) .............................. 10201407705S

(51) Int. Cl.
*G06F 17/30*  (2006.01)
*G06F 21/60*  (2013.01)
*G06F 21/62*  (2013.01)

(52) U.S. Cl.
CPC .. *G06F 17/30477* (2013.01); *G06F 17/30336* (2013.01); *G06F 21/602* (2013.01); *G06F 21/6227* (2013.01)

(58) Field of Classification Search
CPC .................................................. G06F 7/30477
See application file for complete search history.

(56) References Cited

U.S. PATENT DOCUMENTS

| | | | |
|---|---|---|---|
| 2009/0248652 A1* | 10/2009 | Iwayama | G06F 17/30678 |
| 2010/0153403 A1* | 6/2010 | Chang | G06F 17/30616 707/747 |
| 2012/0078914 A1* | 3/2012 | Roeder | G06F 17/30619 707/741 |
| 2013/0262852 A1* | 10/2013 | Roeder | H04L 9/0894 713/150 |
| 2015/0039885 A1* | 2/2015 | Cash | G06F 21/6227 713/165 |
| 2016/0132692 A1* | 5/2016 | Kerschbaum | G06F 21/6227 713/189 |

FOREIGN PATENT DOCUMENTS

CN    103731432    4/2014

OTHER PUBLICATIONS

Cash et al., "Dynamic Searchable Encryption in Very-Large Databases: Data Structures and Implementation", NDSS '14, Feb. 23-26, 2014, San Diego, CA, USA, pp. 1-16.

(Continued)

*Primary Examiner* — Syling Yen
*Assistant Examiner* — Tony Wu
(74) *Attorney, Agent, or Firm* — Staas & Halsey LLP

(57) ABSTRACT

A system and method for searching a symmetrically encrypted database for conjunctive keywords is provided. More particularly, the system and method provides means for searching a symmetrically encrypted database for conjunctive keywords by utilizing an encrypted index table and a Bloom filter. The encrypted index table contains encrypted keywords and their associated index pairs while the Bloom filter contains elements that represent encrypted identity-keyword pairs of the database.

16 Claims, 12 Drawing Sheets

(56) References Cited

OTHER PUBLICATIONS

Cash et al., "Highly-Scalable Searchable Symmetric Encryption with Support for Boolean Queries", 2013, pp. 1-21.
Manolios et al., "Efficient Circuit to CNF Conversion", SAT 2007, LNCS 4501, 2007, pp. 4-9.
Song et al., "Practical Techniques for Searches on Encrypted Data", 2000, 12pp.

* cited by examiner

| File ID | Item 1 | Item 2 | Item 3 | Item 4 | Item 5 | Keywords |
|---|---|---|---|---|---|---|
| 1 | $w_1$ | $w_2$ | $w_3$ | $w_4$ | $w_5$ | $w_1, w_2, w_3, w_4, w_5$ |
| 2 | $w_6$ | $w_1$ | $w_2$ | $w_5$ | $w_7$ | $w_6, w_1, w_2, w_5, w_7$ |
| 3 | $w_8$ | $w_9$ | $w_4$ | $w_2$ | $w_1$ | $w_8, w_9, w_4, w_2, w_1$ |
| 4 | $w_{10}$ | $w_3$ | $w_4$ | $w_5$ | $w_7$ | $w_{10}, w_3, w_4, w_5, w_7$ |
| 5 | $w_{11}$ | $w_2$ | $w_3$ | $w_5$ | $w_7$ | $w_{11}, w_2, w_3, w_5, w_7$ |
| 6 | $w_{12}$ | $w_1$ | $w_3$ | $w_5$ | $w_4$ | $w_{12}, w_1, w_3, w_5, w_4$ |

205

Identity-Keyword Pair Record = $\{(1, w_1), (1, w_2), (1, w_3), (1, w_4), (1, w_5),$ $(2, w_6), (2, w_1), (2, w_2), (2, w_5), (2, w_7),$ $(3, w_8), (3, w_9), (3, w_4), (3, w_2), (3, w_1),$ $(4, w_{10}), (4, w_3), (4, w_4), (4, w_5), (4, w_7),$ $(5, w_{11}), (5, w_2), (5, w_3), (5, w_5), (5, w_7),$ $(6, w_{12}), (6, w_1), (6, w_3), (6, w_5), (6, w_4)\}$

FIGURE 2

TSet (Encrypted Index Table):-

| $q_i$ 402 | t (Index Pairs) 404 |
|---|---|
| $q_1$ | $(e_1,y_1), (e_2,y_2), (e_3,y_3), (e_4,y_4)$ |
| $q_2$ | $(e_5,y_5), (e_6,y_6), (e_7,y_7), (e_8,y_8)$ |
| $q_3$ | $(e_9,y_9), (e_{10},y_{10}), (e_{11},y_{11}), (e_{12},y_{12})$ |
| $q_4$ | $(e_{13},y_{13}), (e_{14},y_{14}), (e_{15},y_{15}), (e_{16},y_{16})$ |
| $q_5$ | $(e_{17},y_{17}), (e_{18},y_{18}), (e_{19},y_{19}), (e_{20},y_{20}), (e_{21},y_{21})$ |
| $q_6$ | $(e_{22},y_{22})$ |
| $q_7$ | $(e_{23},y_{23}), (e_{24},y_{24}), (e_{25},y_{25})$ |
| $q_8$ | $(e_{26},y_{26})$ |
| $q_9$ | $(e_{27},y_{27})$ |
| $q_{10}$ | $(e_{28},y_{28})$ |
| $q_{11}$ | $(e_{29},y_{29})$ |
| $q_{12}$ | $(e_{30},y_{30})$ |

XSet (Bloom Filter):-

406

$g^{Fp(Kx,W1).Xid1}$ $g^{Fp(Kx,W1).Xid2}$ $g^{Fp(Kx,W1).Xid3}$ $g^{Fp(Kx,W1).Xid6}$ $g^{Fp(Kx,W2).Xid1}$ $g^{Fp(Kx,W2).Xid2}$
$g^{Fp(Kx,W2).Xid3}$ $g^{Fp(Kx,W2).Xid5}$ $g^{Fp(Kx,W3).Xid1}$ $g^{Fp(Kx,W3).Xid4}$ $g^{Fp(Kx,W3).Xid5}$ $g^{Fp(Kx,W3).Xid6}$
$g^{Fp(Kx,W4).Xid1}$ $g^{Fp(Kx,W4).Xid3}$ $g^{Fp(Kx,W4).Xid4}$ $g^{Fp(Kx,W4).Xid6}$ $g^{Fp(Kx,W5).Xid1}$ $g^{Fp(Kx,W5).Xid2}$
$g^{Fp(Kx,W5).Xid4}$ $g^{Fp(Kx,W5).Xid5}$ $g^{Fp(Kx,W5).Xid6}$ $g^{Fp(Kx,W6).Xid2}$ $g^{Fp(Kx,W7).Xid2}$ $g^{Fp(Kx,W7).Xid4}$
$g^{Fp(Kx,W7).Xid5}$ $g^{Fp(Kx,W8).Xid3}$ $g^{Fp(Kx,W9).Xid3}$ $g^{Fp(Kx,W10).Xid4}$ $g^{Fp(Kx,W11).Xid5}$ $g^{Fp(Kx,W12).Xid6}$

FIGURE 4

SYSTEM AND METHOD FOR SEARCHING A SYMMETRICALLY ENCRYPTED DATABASE FOR CONJUNCTIVE KEYWORDS

CROSS-REFERENCE TO RELATED APPLICATION

This application claims priority to Singapore Patent Application No. SG10201407705S, filed with the Singapore Patent Office on Nov. 18, 2014, which is hereby incorporated by reference in its entirety.

FIELD OF THE INVENTION

Embodiments of the present invention relate to a system and method for searching a symmetrically encrypted database for conjunctive keywords. More particularly, embodiments of the present invention relate to a system and method for searching a symmetrically encrypted database using an encrypted index table having encrypted keywords and their associated index pairs and a Bloom filter having elements that represent encrypted identity-keyword pairs. The index pairs and the encrypted identity-keyword pairs are generated using keywords from the database and their corresponding location or locations in the unencrypted database.

BACKGROUND

Most users tend to store various types of documents, including documents that contain private and sensitive information, in remote data servers. Such data servers are typically managed and owned by an external entity. While contractual obligations would compel the external entity to take security measures to ensure that no unauthorized access of documents stored within the data servers occur, there may be little that prevents the external entity itself from accessing the sensitive information contained within these documents should they wish to do so. Further, although the external entity would have taken security measures to prevent unauthorized access to documents stored within the data servers, security breaches may still inadvertently occur resulting in access to the documents being granted accidentally.

This problem may be addressed by encrypting the information contained within the documents and storing the documents in the data servers in an encrypted format. By doing so, the owner of the document would be the only person who would be able to access the information contained within the documents as the user would be the only one who would possess the secret key to decrypt the document. A common way to encrypt data is to use strong encryption methods such as the Advanced Encryption Standard (AES). AES is a standard of electronic encryption of data that utilizes symmetric keys to encrypt data. AES functions as follows. Data in a plaintext or clear text format is first inserted into a database. A user then uses a secret key to encrypt data in the database into a ciphertext. To retrieve the data, the user obtains the cipher-text from the database. The user then uses his secret key to decrypt the cipher-text to produce the original text.

The downside of this approach is that the user is prevented from carrying out any remote operations on the encrypted documents. For example, if the user wanted to carry out a remote search of the encrypted documents for specific data, the user would have to download all the documents into their local device, decrypt all the documents, and then carry out the search using the decrypted documents for the specific data. This methodology would only be useful if a small number of documents were to be searched. If the user is required to download a large number of documents to their local device before these documents may be decrypted and searched, this would run counter to the user's original motivation for storing a large number of documents in a remote data server. Ideally, the search should be carried out at the remote server whereby encrypted documents stored on the remote server are searched, and only the relevant encrypted documents and/or pages are returned to the user. This would mean that the user only needs to download encrypted documents and/or pages that contain the queried information and in spite of carrying out the searches at the remote server, the administrator of the remote server would not be aware of the queried information or the information contained within the downloaded data. Although there are many challenges in searching large volumes of encrypted documents for specific data, the encryption of documents or the information contained therein is widely recognized as an optimal method for protecting data at rest and for preventing the unauthorized access or theft of data. As such, those skilled in the art have come up with ways to search an encrypted database at a remote server for specific data without having to download the documents in an encrypted database to a local system before commencing the searching process.

A solution that has been developed to address the problem of searching large volumes of encrypted data for specific information is the Searchable Symmetric Encryption (SSE) solution. This solution utilizes a secure index that allows the user to search in real time for documents containing specified keywords. In short, a secure index allows users with a "trapdoor" for a "WORD" to test the index for only the "WORD". During the search process, the secure index does not reveal any information about its contents. As the user is the only person who holds the secret key to generate trapdoors, the secure index safeguards the contents of the encrypted data from unauthorized access from unauthorized users. Most practical implementations of SSE only support the searching of documents for a single keyword. In such implementations, the remote server's work scales according to the size of the result set and the leakage to the server is limited to the set of encrypted documents that are returned and some global parameters of the system such as total data size and number of documents.

Another solution that has been proposed to address the problem of searching large encrypted databases utilizes secure two party protocols in which the remote server is provided with secure indices to encrypted documents and the client possesses a list of keywords to be queried. As the solution pre-computes parts of the protocol's messages and stores them in encrypted form in the remote server, the solution does away with multiple rounds of interactions between the remote server and the user. Due to the pre-computation that has taken place prior to the search, the user sends information to the server that allows the pre-computed information to be unlocked during a search without further interaction required between the user and the remote server. When the remote server is queried with the keywords, the remote server uses the secure indices to provide the user with encrypted pointers that point to documents that contain the queried keywords. The user then decrypts these pointers to obtain the documents that contain the required keywords. This solution is secure as the remote server is not unable to decrypt the pointers on its end nor can the remote server learn of the keywords in the client's query. However, these solutions do not allow for the searching of conjunctive keywords in a symmetrically encrypted database as they deal mostly with single keyword searches or multiple keyword searches.

For the above reasons, those skilled in the art are constantly striving to come up with a system and method that allows a user to search a symmetrically encrypted database for conjunctive keywords in a computationally efficient manner.

SUMMARY

The above and other problems are solved and an advance in the art is made by systems and methods provided by embodiments in accordance with the invention. A first advantage of embodiments of systems and methods in accordance with the invention is that data and/or information stored on the server always remain in an encrypted state thereby ensuring that no unauthorized person will be able to access the data and/or information stored in the server. A second advantage of embodiment of systems and methods in accordance with the invention is that for the queried conjunctive keywords, trapdoors are generated by the user device only for the keywords contained in a shortest clause without a NOT operator. This increases the efficiency of the system as trapdoors need not be generated for all the other keywords contained in the other clauses. A third advantage of embodiment of systems and methods in accordance with the invention is that the server is never made aware of the conjunctive keywords that are being queried as all data transmissions to the server are in an encrypted format and when the server returns the file identity or location of the queried conjunctive keywords, this information is also returned in an encrypted format thereby reducing the possibility of data leakage.

The above advantages are provided by embodiments of a system in accordance with the invention operating in the following manner. The system has a processing unit and a media readable by the processing unit. The media is configured to store instructions that when executed by the processing unit, cause the processing unit to decrypt the encrypted database and associate each keyword from the decrypted database with a file identity and to generate an encrypted index table comprising encrypted keywords and their associated index pairs, wherein each encrypted keyword that is encrypted using secret key $K_T$ is associated with at least an index pair and wherein each index pair comprises an e parameter and a y parameter. The instructions when executed by the processing unit also directs the processing unit to populate a Bloom filter with elements that each contain a symmetrically encrypted keyword from the database and a symmetrically encrypted file identity that is associated with the keyword. The instructions when executed by the processing unit also directs the processing unit to receive queried conjunctive keywords and select a shortest clause without a NOT operator from the conjunctive keywords, and to generate trapdoors for all keywords contained in the selected shortest clause and retrieve corresponding index pairs from the encrypted index table using the generated trapdoors. The instructions when executed by the processing unit also directs the processing unit to compute a group of search tokens for each of the keywords in the shortest clause wherein each group of search tokens is associated with an index pair retrieved for a keyword from the shortest clause and keywords from the other clauses in the conjunctive keywords, and to determine whether conjunctive keyword permutations are available in the encrypted database by evaluating a group of computed search tokens with operators contained in the other clauses, and if the evaluation of the group of computed search tokens with operators contained in the other clauses returns a positive result, decrypt an e parameter of an index pair associated with the group of computed search tokens.

In accordance with embodiments of the invention, the instructions to generate the encrypted index table comprise additional instructions for directing the processing unit to compute the e parameter in the index table using the following equation:

$$e = \text{Enc}(K_E, \text{file ID})$$

where $K_E = F(K_S, w_i)$, F is a pseudorandom function, $w_i$ represents a keyword from the database, file ID is a file identity associated with $w_i$, $K_S$ is a secret key and Enc is a symmetric encryption function.

In accordance with embodiments of the invention, the instructions to generate the encrypted index table comprise additional instructions for directing the processing unit to compute the y parameter in the index table using the following equation:

$$y = \frac{xid_{file ID}}{F_P(K_Z, w_i \| c)}$$

where $xid_{file\ ID} = F_P(K_{ID}, \text{file ID})$, $F_P$ is a pseudorandom function, $K_Z$ and $K_{ID}$ are secret keys, $w_i$ represents a keyword from the database, file ID is a file identity associated with $w_i$, and c is a counter to track the number of index pairs created for $w_i$.

In accordance with embodiments of the invention, the instructions to populate the Bloom Filter comprise additional instructions for directing the processing unit to compute each element in the Bloom Filter using the following equation:

$$g^{F_P(K_X, w_i) \cdot xid_{file\ ID}}$$

where $xid_{file\ ID} = F_P(K_{ID}, \text{file ID})$, $F_P$ is a pseudorandom function, $K_X$ and $K_{ID}$ are secret keys, $w_i$ represents a keyword from the database, and file ID is a file identity associated with $w_i$.

In accordance with embodiments of the invention, the instructions to compute the group of search tokens for each of the keywords in the shortest clause comprise additional instructions for directing the processing unit to compute each search using the following equation:

$$\text{token}[c][j] = g^{F_P(K_X, q_j) \cdot F_P(K_Z, q_i \| c) \cdot y}$$

where $q_j$ is the $j^{th}$ selected keyword from the other clauses, $q_j$ is the $i^{th}$ selected keyword from the shortest clause, c is a counter showing the number of an index pair retrieved for $q_i$; j is the number of the selected keyword from the other clauses, $F_P$ is a pseudorandom function, $K_X$, $K_Z$ are secret keys and y is a parameter obtained from the selected index pair.

In accordance with embodiments of the invention, the instructions to generate trapdoors for all keywords contained in the selected shortest clause comprise instructions for directing the processing unit to encrypt each keyword in the shortest clause using secret key $K_T$.

In accordance with embodiments of the invention, the instructions to determine whether conjunctive keyword permutations are available in the encrypted database by evaluating a group of computed search tokens with operators contained in the other clause comprise instructions for directing the processing unit to create a test array for storing an array of TRUE or FALSE results, compare each search token from the computed group of search tokens with elements contained in the Bloom filter to determine whether there is a match, and populating the test array with the results from the comparison, evaluate the populated test array with an operator array, wherein the operator array contains operators from the other clauses, and provide a positive or negative result depending on the evaluation outcome.

In accordance with embodiments of the invention, the instructions to decrypt an e parameter of the index pair associated with the group of computed search tokens comprise instructions for directing the processing unit to generate a decryption key for a keyword from the shortest clause that is associated with the group of computed search tokens using the following equation:

$$K_E = F(K_S, q_i)$$

where $q_i$ is the $i^{th}$ selected keyword from the shortest clause, Ks is a secret key and F is a pseudorandom function; and decrypt the e parameter using the following equation:

$$\text{file ID} = \text{Dec}(K_E, e)$$

where file ID is a file identity associated with $q_i$ and Dec is a symmetric decryption function.

BRIEF DESCRIPTION OF THE DRAWINGS

The above advantages and features in accordance with this invention are described in the following detailed description and are shown in the following drawings:

FIG. 2 illustrating a representative unencrypted database and a list of identity keyword pairs associated with the data in the unencrypted database;

FIG. 4 illustrating an encrypted index table and a Bloom filter generated using the identity keyword pairs in FIG. 2;

DESCRIPTION OF EMBODIMENTS

This invention relates to a system and method for searching a symmetrically encrypted database for conjunctive keywords. More particularly, this invention relates to a system and method for searching a symmetrically encrypted database using an encrypted index table having encrypted keywords and their associated index pairs and a Bloom filter having elements that represent encrypted identity-keyword pairs. The index pairs and the encrypted identity-keyword pairs are generated using keywords and their corresponding location or locations in the unencrypted database.

Figure 1:
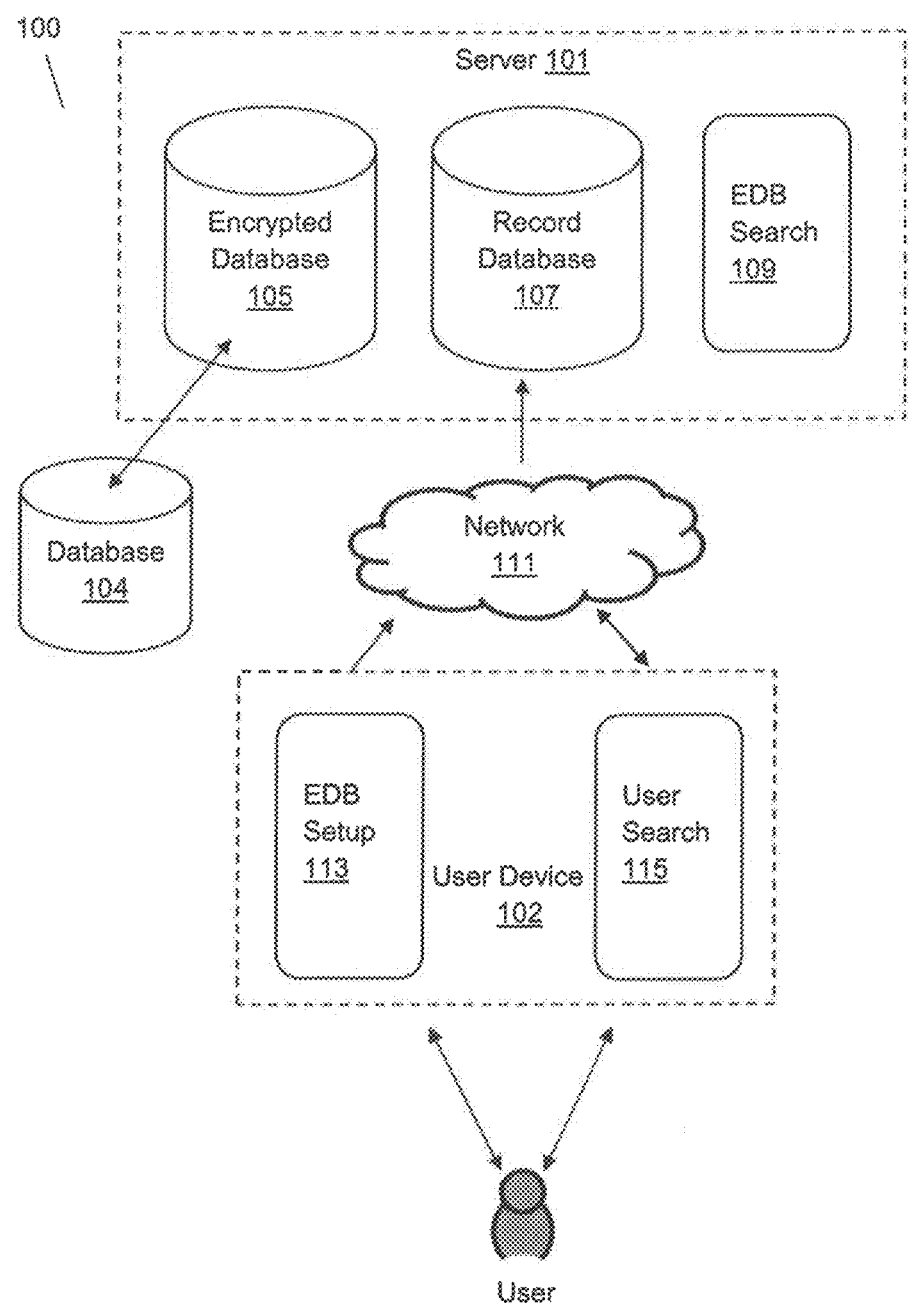
FIG. 1 illustrating a block diagram of a system for searching an encrypted database for conjunctive keywords in accordance with an embodiment of the invention.

FIG. 1 illustrates system 100 that includes modules and devices that execute processes to provide a method and system for searching a symmetrically encrypted database for conjunctive keywords in accordance with embodiments of the invention. System 100 includes server 101 that is connected to user device 102 via network 111. Network 111 is a communications network that allows processing systems to communicate with one another either through wired means, wireless means or a combination of both. Wired means may include a wired network such as a wide area network (WAN) or a local area network (LAN), while wireless means includes connections established via Radio Frequency (RF) signals, infrared signals, or any other means of wireless transmissions. User device 102 may include any computing devices that have a display and an alphanumeric input device such as smart phones, laptops, tablets, computers, workstations, game consoles and so on. One skilled in the art will recognize that user device 102 is only provided as an example and other types of devices with displays and alphanumeric input means may be used to interact with server 101 without departing from this invention. Contained within user device 102 is EDB setup module 113. EDB setup 113 is a module that is used to generate record database 107. Record database 107 is then subsequently transmitted to server 101 via network 111. The other module in user device 102 is user search module 115. User search 115 is a module that interacts with EDB search module 109 in server 101, via network 111, to search encrypted database 105 for conjunctive keywords.

Server 101 may comprise computer servers or cloud computing servers that are used to host large amounts of data. Such servers are typically located at secure data centres whereby access to data or modules contained within is limited to those with the appropriate authorization. Server 101 is able to store data and execute various processes such as transmitting data to and receiving data from user device 102 via network 111 and perform other types of computer related processes. A user of system 100 will first symmetrically encrypt database 104 using standard encryption mechanisms such as, but not limited to, Advanced Encryption Standard (AES), before encrypted database 105 is uploaded to server 101. By doing so, the entity managing server 101 would not be able to access the data contained within encrypted database 105 as the user would be the only one having the decryption keys for symmetrically decrypting data within encrypted database 105.

FIG. 2 illustrates information about parameters that may be obtained from data contained within database 104 before database 104 is encrypted and loaded into server 101 as encrypted database 105. One skilled in the art will recognize that even though reference is made to the encryption of "data", the one skilled in the art will understand that the term data has a broad connotation and may be used to refer to any unit of information of any nature that may be catalogued and stored in a database format. For example, the term data may refer to a document or an item that includes a subset of works that form an integral part of a document or it may refer to any form of text bearing item, a picture with text, a financial record or any combination thereof and so on. In accordance with embodiments of the invention, certain parameters have to be set up before the search system may be utilized by the user. The setup process is described below with reference to FIGS. 2, 3 and 4.

As shown in FIG. 2, content 205 in columns Item 1-5 may be considered as "data" for the purposes of this invention. Data 205 is first organized into columns and rows, with each row being accorded a file identity, i.e. a file ID. A new parameter, which is the "keywords" column, is also added to the database and all the keywords belonging to a particular row are set out in this keywords column. For example, for file ID=1, the keywords in the corresponding column will comprise $w_1$, $w_2$, $w_3$, $w_4$, $w_5$, or when file ID=2, the keywords in the corresponding column will comprise $w_6$, $w_1$, $w_2$, $w_5$, $w_7$ and so on. In the example shown in FIG. 2, each keyword $w_i$ (where i=1 . . . 12) refers to a unique keyword. For example, $w_1$ may refer to "Adam" and this would mean that the name Adam appears in multiple locations within data 205. In order to identify the location where each keyword appears, an identity-keyword pair record is generated using information contained within the keywords column and its corresponding file identity. Such an identity-keyword pair record based on data 205 has been created and is illustrated in FIG. 2. A user may then efficiently obtain the location of a particular keyword by obtaining the identity-keyword pair of that particular keyword. For example, for keyword-pairs $\{(1,w_1), (2,w_1), (3,w_1), (6,w_1)\}$, the user would understand that the keyword $w_1$ occurs in rows that correspond to file ID 1, 2, 3 and 6.

Figure 3:
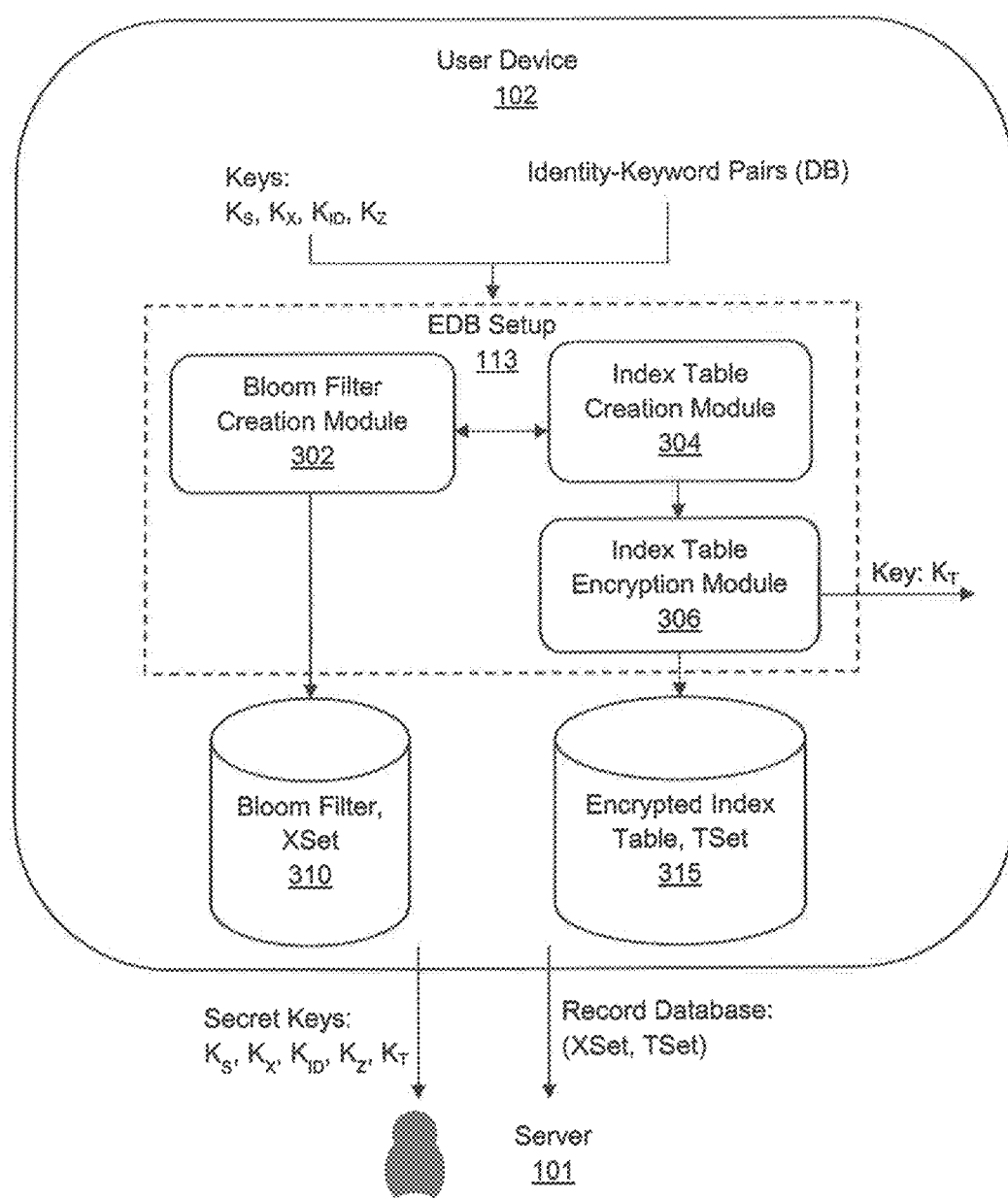
FIG. 3 illustrating a block diagram of modules contained within a user device in accordance with an embodiment of the invention for generating an encrypted index table and a corresponding Bloom filter using identity keyword pairs from the unencrypted database.

FIG. 3 illustrates the operation of EDB setup module 113 within user device 102. After the identity-keyword pair record has been generated by the user using user device 102, the identity-keyword pair record is used by EDB setup module 113 to populate a Bloom Filter and to generate an encrypted index table. Index table creation module 304 first creates a blank index table. This index table is then subsequently populated with indexed keywords and index pairs that are created for each indexed keyword.

In accordance with embodiments of the invention, index pairs corresponding to an indexed keyword may be generated by index table creation module 304 as follows. Creation module 304 begins by selecting the first keyword in the identity-keyword pair record. In the example illustrated in FIG. 2, the first keyword would be $w_1$, as obtained from identity keyword pair $(1,w_1)$. Creation module 304 then indexes the keyword from the selected identity keyword pair into the index table. In this example, this would mean that $w_1$ is indexed into the index table.

Creation module 304 then selects all identity keyword pairs that contain keyword $w_1$, e.g. $\{(1,w_1), (2,w_1), (3,w_1), (6,w_1)\}$ from the identity keyword pair record. A counter, c, is then initialized to 1 and each time creation module 304 selects the next identity keyword pair from the list set out above, counter, c, will increment by 1 until all the identity keyword pairs in the list have been selected. In the list above, for keyword $w_1$, this would mean that counter, c, would increase to a maximum of 4 as there are only 4 identity keyword pairs in the above list.

Using secret key KS and keyword w1 as inputs, a pseudorandom function generator provided within creation module 304 then generates an obfuscated keyword to represent keyword $w_1$. This operation may be carried out by the following algorithm:

$$K_E = F(K_S, w_1) \tag{1}$$

where $K_E$ is the obfuscated keyword, and $K_S$ is the secret key used by pseudorandom function, F to obfuscate keyword $w_1$.

Creation module 304 then selects the first identity keyword pair, e.g. $(1,w_1)$, from the previously selected identity keyword pairs. The file identity of the selected index keyword pair is then obfuscated. This operation may be carried out by the following algorithm:

$$xid_{file\ ID} = F_P(K_{ID}, \text{file ID}) \tag{2}$$

where $xid_{file\ ID}$ is the obfuscated file identity of the selected index keyword pair, and $F_P$ is a pseudorandom function generator that uses secret key $K_{ID}$ to obfuscate the selected file identity, file ID. In the example provided above, this would result in $xid_1 = F_P(K_{ID}, 1)$.

The identity keyword pair is secondly used by creation module 304 to generate element "y". The generation of element y may be carried out by the following algorithm:

$$y = \frac{xid_{fileID}}{F_P(K_Z, w_1 \| c)} \tag{3}$$

where $xid_{file\ ID}$ is obtained from equation (2) above, $F_P$ is a pseudorandom function generator that uses secret key $K_Z$ to obfuscate the selected keyword, $w_1$, that has been concatenated with counter, c. In this example, the value of counter c is 1 and as such, the resulting value is $$y = \frac{xid_1}{F_P(K_Z, w_1 \| 1)}.$$

The identity keyword pair is then used by creation module 304 to generate element "e". The generation of element e may be carried out by the following algorithm:

$$e = \text{Enc}(K_E, \text{file ID}) \tag{4}$$

where e is the encrypted file identity of the selected index keyword pair, Enc is a symmetric key encryption scheme that uses secret key $K_E$ (generated using equation (1) above) to obfuscate the selected file identity, file ID. In the example provided above, this would result in $e = \text{Enc}(K_E, 1)$.

The elements e and y that were calculated using equations (4) and (3) respectively make up the elements in an index pair, i.e. (e,y). As this is the first index pair created by creation module 304, this index pair is accorded with the subset value of 1 resulting in index pair $(e_1, y_1)$. This first index pair is then appended to the index table in a row corresponding to indexed keyword $w_1$. The subset value that is accorded to the subsets of the e and y elements in the index pairs will increase by 1 for every newly created index pair until all the index pairs have been created. In other words, this means that the next newly created index pair will have a subset value of ($e_2$, $y_2$) and the next index pair will have subset values of ($e_3$, $y_3$) and so on.

After the index pair has been appended to the index table, creation module 304 will then transmit the selected keyword, $w_1$, and the obfuscated file identity of the selected index keyword pair xid$_{file\ ID}$=$F_P(K_{ID}$, file ID) to Bloom Filter creation module 302. Creation module 302 will then use the received information to generate a Bloom Filter element using the following equation:

$$g^{F_p(K_X, w_1) \cdot xid_{file\ ID}}$$

For the example above, this would result in the generation of the following Boom filter element, $g^{F_p(K_X, w_1) \cdot xid_1}$. The generated Bloom Filter element is then added to the Bloom Filter. The purpose of setting up the Bloom Filter as such is so that a user may use the Bloom Filter to efficiently check whether a particular identity keyword pair is present.

The processes above that involve equations (1)-(4) and the steps of creating the Bloom Filter element are all repeated by creation modules 304 and 302 on the remaining identity-keyword pairs in the list. Continuing from the example described above, this means that the remaining identity keyword pairs (2,$w_1$), (3,$w_1$), (6,$w_1$) in the list will produce index pairs ($e_2$,$y_2$), ($e_3$,$y_3$), ($e_4$,$y_4$) and the following Bloom Filter elements:

$$g^{F_p(K_X, w_1) \cdot xid_2}, g^{F_p(K_X, w_1) \cdot xid_3}, g^{F_p(K_X, w_1) \cdot xid_6}$$

The index pairs will all be appended to the index table and will be associated with indexed keyword w1 while all the Bloom Filter elements will be added to the Bloom Filter.

Creation module 304 will then proceed to select all identity keyword pairs that contain the next keyword in data 205 which in this case would be $w_2$, e.g. {(1,$w_2$), (2,$w_2$), (3,$w_2$), (5,$w_2$)}. The previous counter, c, is then reinitialized to 1 and similarly, each time creation module 304 selects the next identity keyword pair from the list set out above, counter, c, will increment by 1 until all the identity keyword pairs in the list have been selected. The processes described above that were carried out in relation to keyword $w_1$ are now repeated for keyword $w_2$. In particular, this would mean that processes relating to equations (1)-(4) are repeated, with keyword $w_2$ replacing the parameter $w_1$ in these equations. Further, the step of creating Bloom Filter elements is also carried out for all the selected identity keyword pairs for keyword $w_2$ This process continuously repeats itself until Bloom Filter elements and index pairs have been created for all the identity keyword pairs contained in the identity keyword pair record. Once this is done, this would result in populated Bloom Filter 310 and an index table whereby all the indexed keywords would be listed with their corresponding index pairs. This index table is then passed from module 304 to index table encryption module 306. Encryption module 306 will then process the received index table by encrypting the indexed keywords in the index table to produce encrypted index table 315 and secret key, $K_T$. Encrypted index table 315 is then transmitted and stored in server 101 while all the secret keys, i.e. $K_S$, $K_X$, $K_{ID}$, $K_Z$, $K_T$, used by processes within EDB setup module 113 are then passed to the user.

To better understand the initial parameter setup process described above, an encrypted index table was generated and a Bloom Filter was populated using the processes described above based on the example provided in FIG. 2. FIG. 4 illustrates the generated index table and the populated Bloom Filter 406. Both of these components were created using the identity keyword pair record provided in FIG. 2. Column 402 of the encrypted index table sets out the indexed keywords that have been encrypted. As for column 404, this column sets out the index pairs that are associated with each encrypted keyword in the encrypted index table.

Upon completion of the parameter setup process, the search system may then be utilized by the user to carry out searches on the encrypted database for conjunctive keywords.

Figure 5:
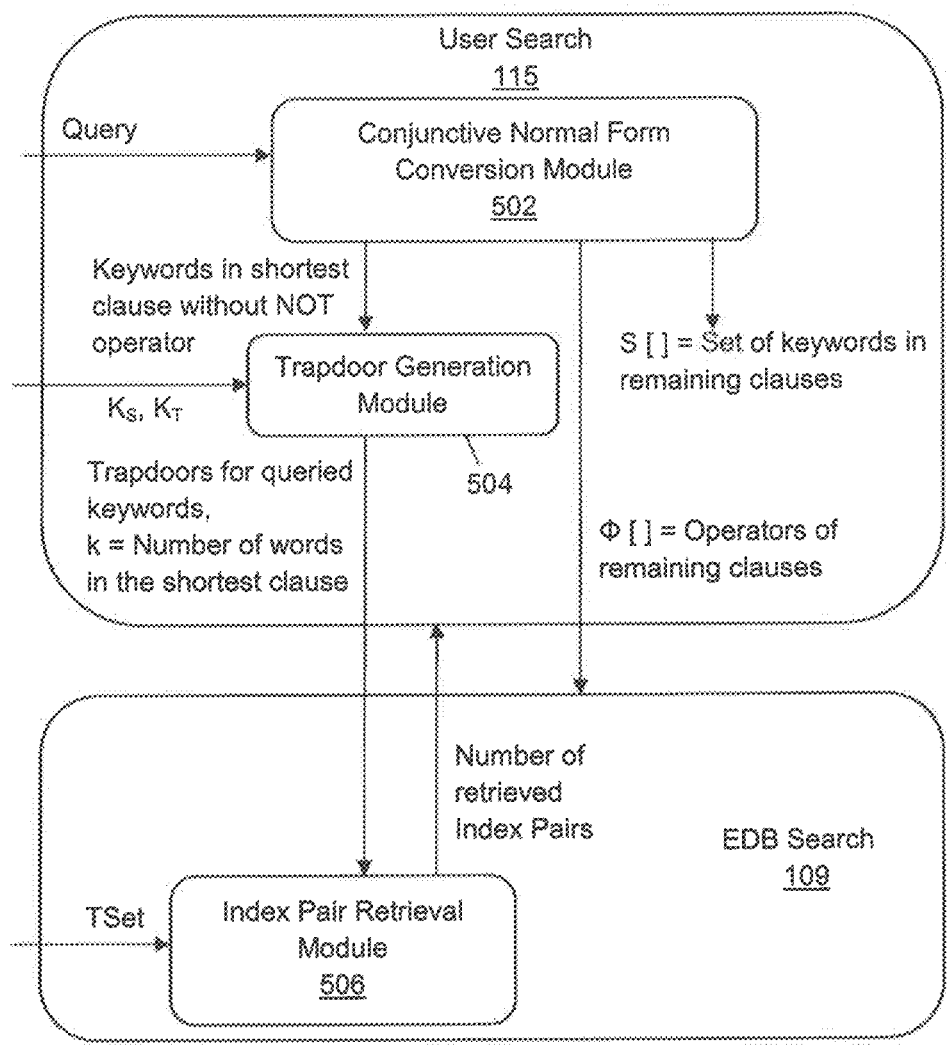
FIG. 5 illustrating a block diagram of modules contained within a user device and a server in accordance with embodiments of the invention for generating trapdoors for queried conjunctive keywords and for retrieving related secure index pairs.

FIG. 5 illustrates the processes that take place between user search module 115 and EDB search module 109 to search encrypted database 105 for conjunctive keywords queried by the user. When conjunctive normal form conversion module 502 receives a query from a user, module 502 will determine whether the query is in a conjunctive normal form. If the query is determined to be in a conjunctive normal form, the query will be considered as conjunctive keywords. If the query is not in a conjunctive normal form, module 502 will run a conversion process to convert the keywords and operators in the query into conjunctive keywords. The workings of the conversion process have been omitted as such a conversion process is known to one skilled in the art. One skilled in the art will also understand that a query is considered to be in a conjunctive normal form if it is a conjunction (sequence of ANDs) consisting of one or more conjuncts, each of which is a disjunction (OR) of one or more literals. The only propositional connectives a formula in conjunctive normal form can contain are (AND), (OR), and (NOT). The (NOT) operator can only be used as part of a literal, which means that it can only precede a propositional variable or a predicate symbol. An example of queried keywords that may be considered as conjunctive keywords is the query for {(Adam OR Eve) AND (Flu OR Fever OR Headache) AND (Teen OR Child NOT OLD)}.

Once it is determined that the queried keywords are conjunctive keywords or after the queried keywords have been converted into conjunctive keywords, module 502 will then select the shortest clause amongst all the clauses in the conjunctive keywords that does not have a NOT operator. Module 502 will then assign the remaining keywords in the other clauses into array S and the operators found in the remaining clauses into array Φ. Array Φ is then transmitted to EDB search module 109 and stored within for later use. One skilled in the art will recognize that references made in the description to the "other clauses" refers to all the remaining clauses in the queried conjunctive keywords after a clause with the least number of keywords and does not contain a NOT operator has been selected and designated as the shortest clause.

As an example, under the assumption that the queried conjunctive keywords comprises: {($q_7$ OR $q_9$) AND ($q_6$ OR $q_{12}$ OR $q_2$)}, the shortest clause in this query that does not contain a NOT operator will be selected by module 502, which is the clause ($q_7$ OR $q_9$). The keywords in the other clauses will then be assigned by module 502 into array S=[$q_6$, $q_{12}$, $q_2$] and the operators found in the remaining clauses will be assigned by module 502 into array Φ=[OR, OR].

Module 502 will then pass the keywords from the shortest clause to trapdoor generation module 504. Trapdoor generation module 504 will then generate trapdoors for each of the keywords in the shortest clause. In accordance with embodiments of the invention, a trapdoor for a keyword may be generated by the following algorithm.

$$\text{stag}[i] = T\text{SetGetTag}(K_T, q_i) \qquad (5)$$

where stag[i] is the trapdoor for the $i^{th}$ keyword in the shortest clause, i=1 ... number of keywords in the shortest clause, $K_T$ is the secret key that was generated by encryption module 306 (see FIG. 3), $q_i$ is the $i^{th}$ keyword in the shortest clause and TSetGetTag is a function for obfuscating the $i^{th}$ keyword in the shortest clause using the same secret key, $K_T$, that was used to encrypt the index table.

Trapdoor generation module 504 then proceeds to generate decryption keys that correspond to each keyword in the shortest clause. In accordance with embodiments of the invention, the generation of the decryption keys may be generated by the following algorithm.

$$K_E[i] = F(K_S, q_i) \qquad (6)$$

where $K_E[i]$ is the decryption key for the $i^{th}$ keyword in the shortest clause, i=1 ... number of keywords in the shortest clause, $K_S$ is the secret key that was used by index table creation module 304 to obfuscate keywords (see equation 1), $q_i$ is the $i^{th}$ keyword in the shortest clause and F is a pseudorandom function. The generated trapdoors are then transmitted to EDB search 109 via network 111.

The transmitted trapdoors for each of the keywords in the shortest clause are received by index pair retrieval module 506. Index pair retrieval module 506 then uses the received trapdoors to retrieve index pairs from encrypted index table 315 that correspond to the keywords in the shortest clause. The retrieved index pairs are then stored in an array "t[ ]". In accordance with embodiments of the invention, the retrieval of the index pairs from encrypted index table 315 may be carried out by the following algorithm.

$$t[i] = T\text{SetRetrieve}(T\text{Set}, \text{stag}[i]) \qquad (7)$$

where t[i] are the index pairs that are retrieved from encrypted index table TSet for the $i^{th}$ keyword in the shortest clause, stag[i] is the trapdoor for the $i^{th}$ keyword in the shortest clause, and i=1 ... number of keywords in the shortest clause. Index pair retrieval module 506 then transmits the retrieved index pairs for each keyword in the shortest clause to user search 115 via network 111.

Figure 6:
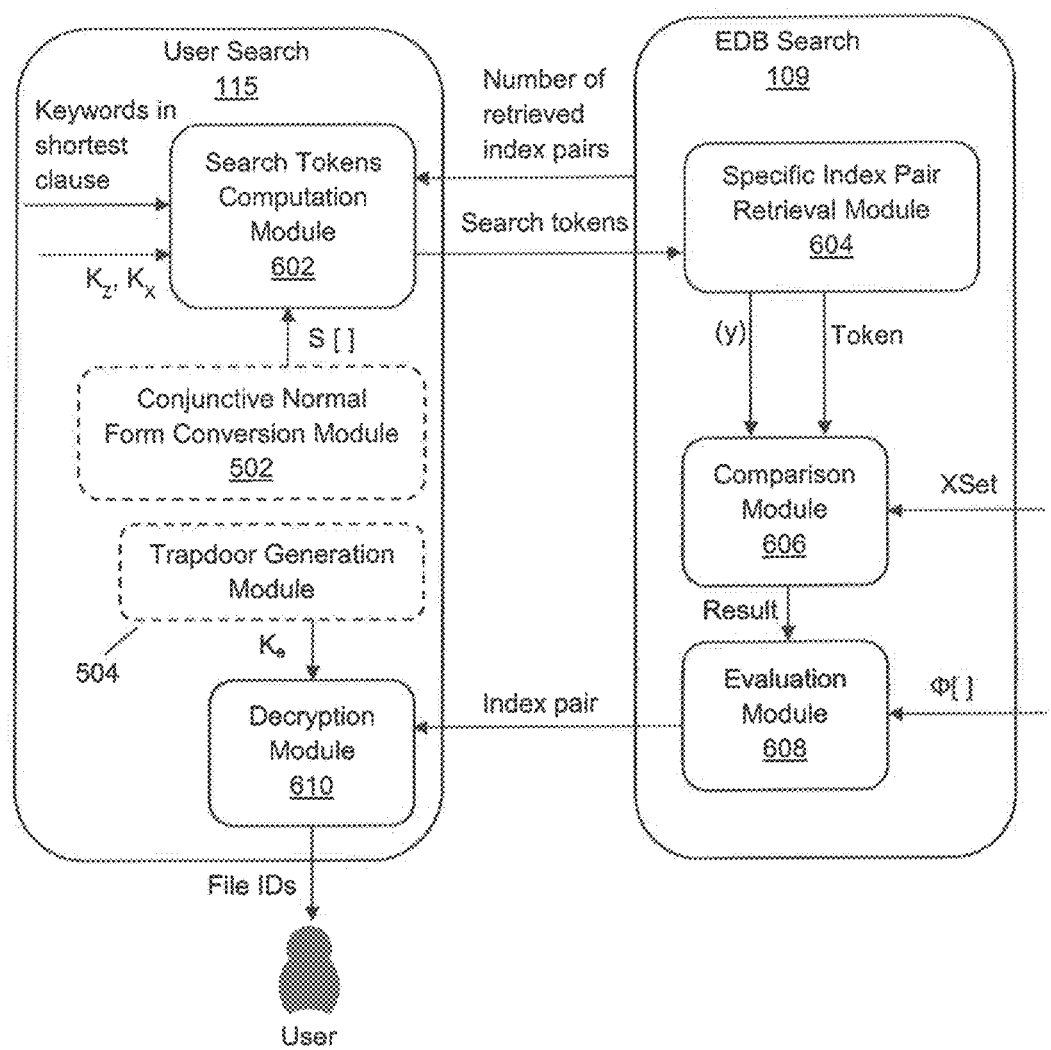
FIG. 6 illustrating a block diagram of modules contained within a user device and a server in accordance with embodiments of the invention for generating search tokens and for determining the availability of conjunctive keywords in the encrypted database.

The transmitted index pairs for each keyword in the shortest clause are then received using search token computation module 602. See FIG. 6. Computation module 602 begins the search token computation process by generating a token array for each keyword in the shortest clause whereby the size of each token array is determined using the following formula:

Token size=(number of retrieved index pairs for a keyword from the shortest clause)×(number of keywords in the remaining clauses) (8)

For each keyword in the shortest clause and for each index pair retrieved for each keyword in the shortest clause, computation module 602 will generate search tokens for each of the keywords in array S using secret keys $K_X$ and $K_Z$. In accordance with embodiments of the invention, the generation of the search tokens may be carried out using the following pseudorandom code.

```
Select the i^th keyword in the shortest clause, where i =
1...number of keywords in the shortest clause       {
    Counter, c = 1 ... number of index pairs retrieved for the selected keyword      {
        For each keyword in the remaining clauses {
        token[c][j] = g^{F_p(K_X,q_j) · F_p(K_Z,q_i||c)}
        where j = number of keywords in the shortest clause + 1 ... number of
        keywords in the remaining clauses, q_j is the j^th keyword of the conjunctive
        keywords queried, q_i is the i^th keyword in the shortest clause, F_P is a
        pseudorandom function, and K_X, K_Z are secret keys used in EDB setup module
        113.
        The generated search tokens, the value of "i" and the value of "c" are then
        transmitted to EDB search 109.                     }
    the value of c is then incremented by 1 and the process above is repeated until c
    equals the number of index pairs retrieved for the selected keyword.            }
    the next keyword in the shortest clause is selected by incrementing i by one}
the process then ends
```

The search tokens for each of the keywords in array S together with the present value of "i" and the present value of "c" are received by specific index pair retrieval module 604 found in EDB search 109. Retrieval module 604 then uses the received "i" and "c" parameters to retrieve the corresponding index pair from array t[ ]. To recap, array t[ ] contains the index pairs that were previously retrieved from encrypted index table for each keyword from the shortest clause where t[i] refers to the index pairs that were retrieved for the $i^{th}$ keyword in the shortest clause. Retrieval module 604 does this by retrieving the $c^{th}$ index pair from the list of previously retrieved index pairs associated with t[i].

The retrieved index pair and the received search tokens are then passed to comparison module 606. Comparison module 606 will raise each search token to the exponent of the "y" element from the retrieved index pair and each resulting search token is then compared against the elements in the Bloom Filter to determine whether the resulting search tokens match any elements in the Bloom Filter. If a match occurs, an array test[j] will be set as TRUE for that resulting search token else, if a match does not occur, the array test [j] will be set as FALSE, where j equals to the number of keywords in shortest clause+1 ... number of keywords in remaining clauses. In accordance with embodiments of the invention, the processes described by comparison module 606 may be carried out using the following pseudorandom code.

```
For j = number of keywords in shortest clause + 1 ... number of
keywords in remaining clauses {
    If token[c][j]^y is in the Bloom Filter, set test[j] = TRUE else set
    test[j] = FALSE
                            }
where y is obtained from the retrieved index pair.
```

The result, array test[ ], is then passed to evaluation module 608. Evaluation module 608 will then evaluate the result using array Φ[ ]. To recap, array Φ[ ] contains all the operators found in the remaining clauses. If evaluation module 608 returns a TRUE evaluation, the retrieved index pair is then transmitted to decryption module 610 found in user search 115. Alternatively, if evaluation module 608 returns a FALSE evaluation, evaluation module 608 will not transmit anything to user search 115.

Decryption module 610 will decrypt the received index pair using the appropriate decryption key to obtain the file identity that corresponds to the index pair. In accordance with embodiments of the invention, this process may be carried out by the following algorithm.

$$\text{File identity} = \text{Dec}(K_E[i], e) \quad (9)$$

where $K_E[i]$ is the decryption key for the $i^{th}$ keyword in the shortest clause Once the user receives the decrypted file identity, the user may use this information to retrieve the exact file that contains the conjunctive keywords required by the user.

In order to provide such a system or method, a process is needed for generating the initial search parameters that are used by the search solution. A process is also needed for querying a symmetrically encrypted database for conjunctive keywords using a computer server and a user device and for returning a location of the queried conjunctive keywords in the encrypted database, if available, to the user. The following description and FIGS. 7-11 describe embodiments of processes that provide processes in accordance with this invention.

Figure 7:
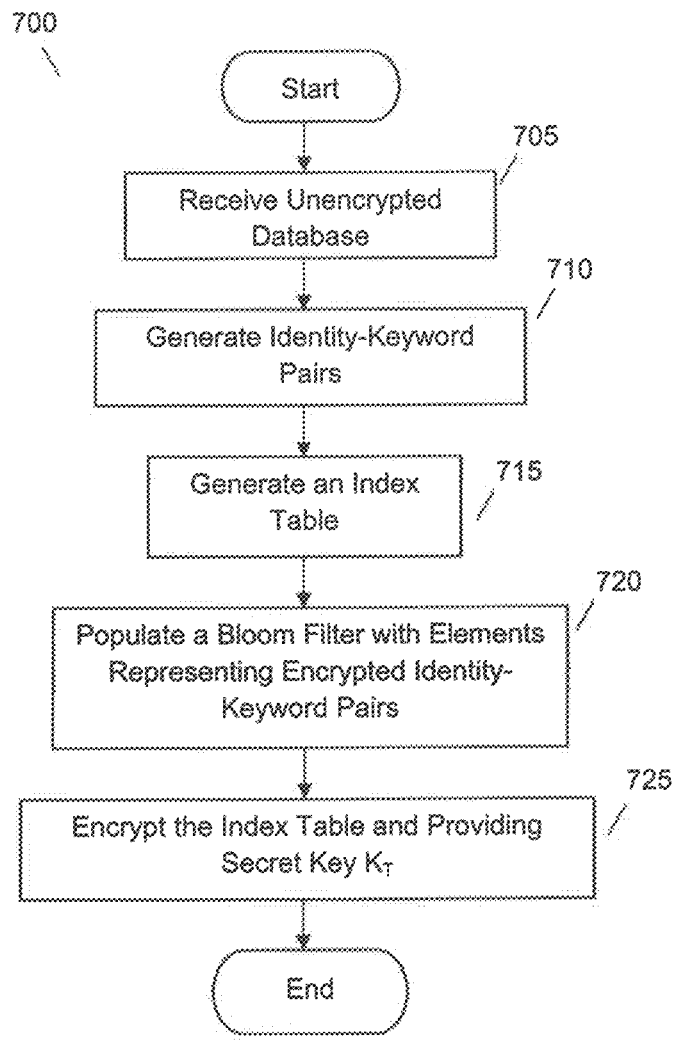
FIG. 7 illustrating a flow diagram of a process for generating an encrypted index table and a corresponding Bloom filter using identity keyword pairs from an unencrypted database in accordance with embodiments of the invention.

FIG. 7 illustrates process 700 that is performed by a computer system to generate an encrypted index table and a Bloom filter in accordance with embodiments of this invention. Process 700 begins in step 705 by receiving an unencrypted database. Identity keyword pairs are then created for the keywords in the database at step 710. Using the newly created identity keyword pairs, process 700 then generates an index table at step 715. As the index pairs in the index table are being created, process 700 will populate a Bloom Filter with elements that represent the corresponding encrypted identity keyword pairs. This is done at step 720. The generated index table is then encrypted by process 700 at step 725. Process 700 then ends.

Figure 8:
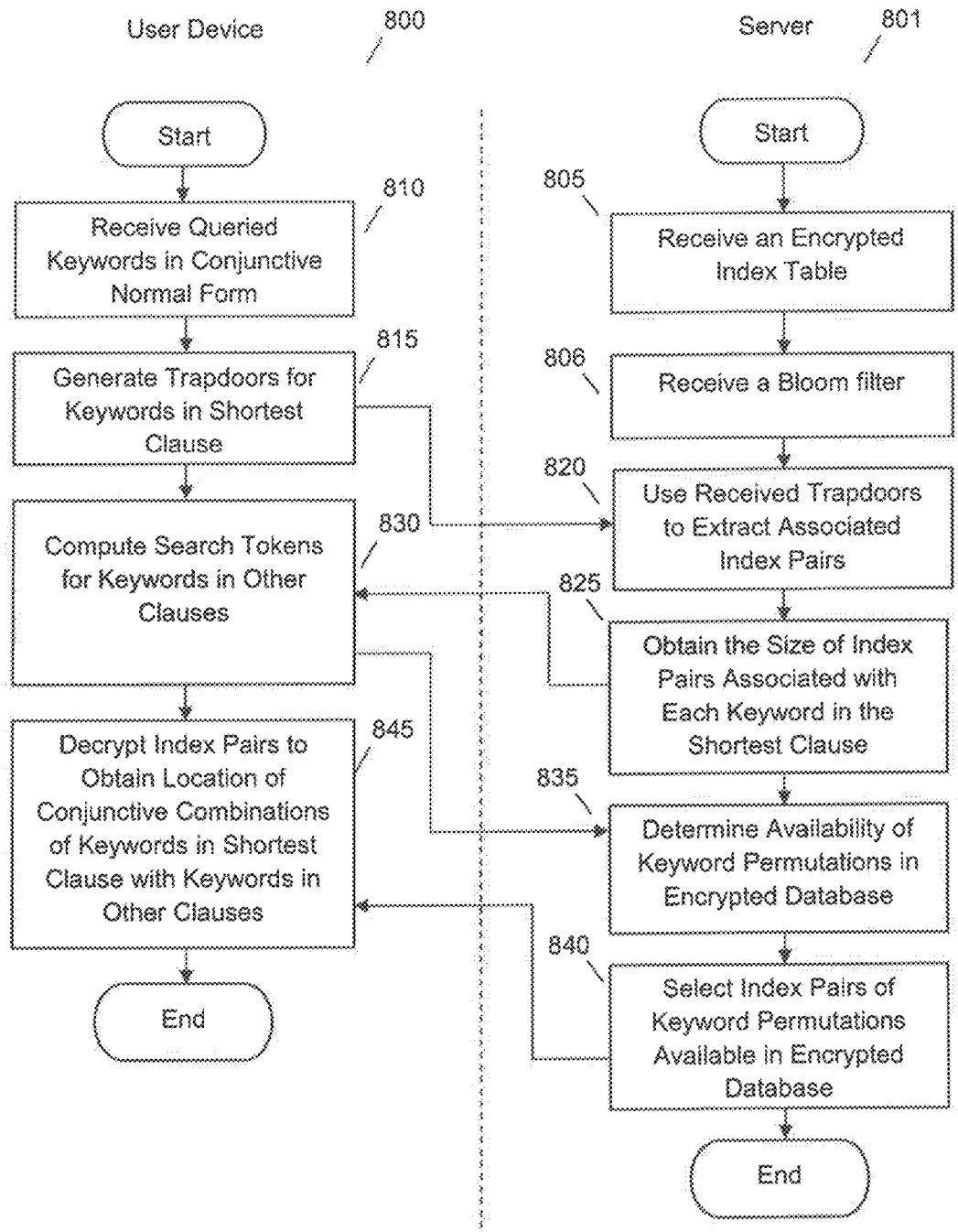
FIG. 8 illustrating a flow diagram of a process for searching a symmetrically encrypted database for conjunctive keywords in accordance with embodiments of the invention.

FIG. 8 illustrates process 800 that is performed by a computer system in a user device and process 801 that is performed by a computer system in a server whereby these two processes are utilized for searching a symmetrically encrypted database for conjunctive keywords in accordance with embodiments of the invention. At the server, process 801 begins at step 805 where process 801 receives an encrypted index table associated with an encrypted database that is to be searched. Process 801 then proceeds to step 806 where process 801 receives a Bloom filter that is also associate with the encrypted database that is to be searched. Process 801 that idles until process 801 receives a query from a user.

At the user device, process 800 begins in step 810 by receiving a query for keywords in a conjunctive normal form or conjunctive keywords. If the query is in a Boolean format, a conversion program may be run to convert the query from a Boolean form to a conjunctive normal form. Process 800 then obtains the shortest clause from the queried conjunctive keywords that does not have a NOT operator. Trapdoors are then created for each of these keywords in the shortest clause at step 815. These trapdoors are then transmitted to the server. At the server, process 801 uses the received trapdoors to extract associated index pairs from the encrypted index table stored in the server. This occurs at step 820. Process 801 then tabulates the number of index pairs that are retrieved for each keyword in the shortest clause in step 825. This information is then transmitted to the user device.

At the user device, process 800 then uses the received information to compute search tokens for each of the keywords in the remaining clauses. This occurs at step 830. The computed search tokens are then transmitted to the server. At the server, process 801 receives the search tokens at step 835. Process 801 then utilizes the search tokens to determine whether a particular queried conjunctive keyword is present in the encrypted database. If process 801 determines that the queried conjunctive keyword is available, process 801 proceeds to step 840 else process 801 will end. At step 840, process 801 selects the index pairs that match with the queried conjunctive keywords and transmits the selected index pairs to the user device. At the user device, process 800 receives the index pairs at step 845. The received index pairs are then decrypted by process 800 to provide the user with the location of the queries conjunctive keywords within the encrypted database. Process 800 then ends.

Figure 9:
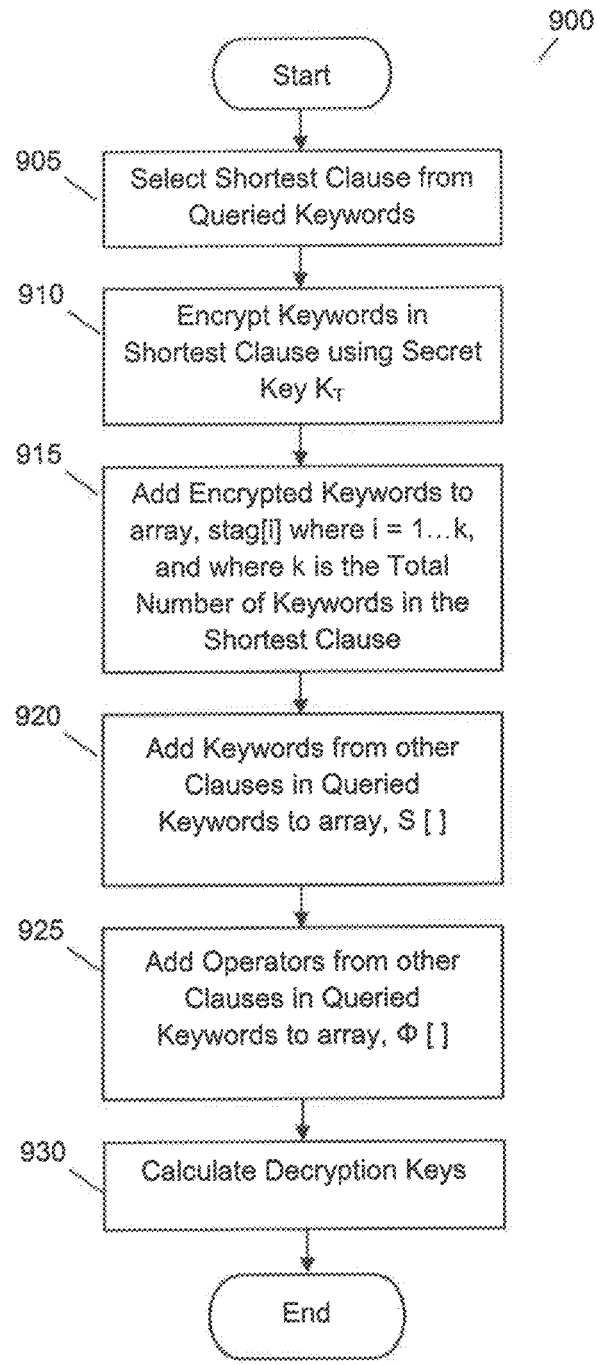
FIG. 9 illustrating a flow diagram of a process for generating trapdoors for keywords in a shortest clause, the shortest clause being selected from the queried conjunctive keywords in accordance with an embodiment of the invention.

FIG. 9 illustrates process 900 that is performed by a computer system to generate trapdoors in accordance with embodiments of this invention. Process 900 begins in step 905 with process 900 first selecting the shortest clause from the queried conjunctive keywords that does not contain a NOT operator. Process 900 then proceeds to step 910 whereby process 900 encrypts the keywords in the shortest clause using secret key $K_T$. At step 915, the encrypted keywords are added to array stag[i] where i=1 . . . k, and where k is the total number of words in the shortest clause. The keywords from the remaining clauses in the queried conjunctive keywords are then added to array S[ ] at step 920 and the operators from the remaining clauses are added to array Φ[ ] at step 925. Process 900 will then generate decryption keys for each of the keywords in the shortest clause at step 930. These decryption keys will be used by the user at a later phase to decrypt the received index pairs to obtain the exact location of the queried conjunctive keywords in the encrypted database.

Figure 10:
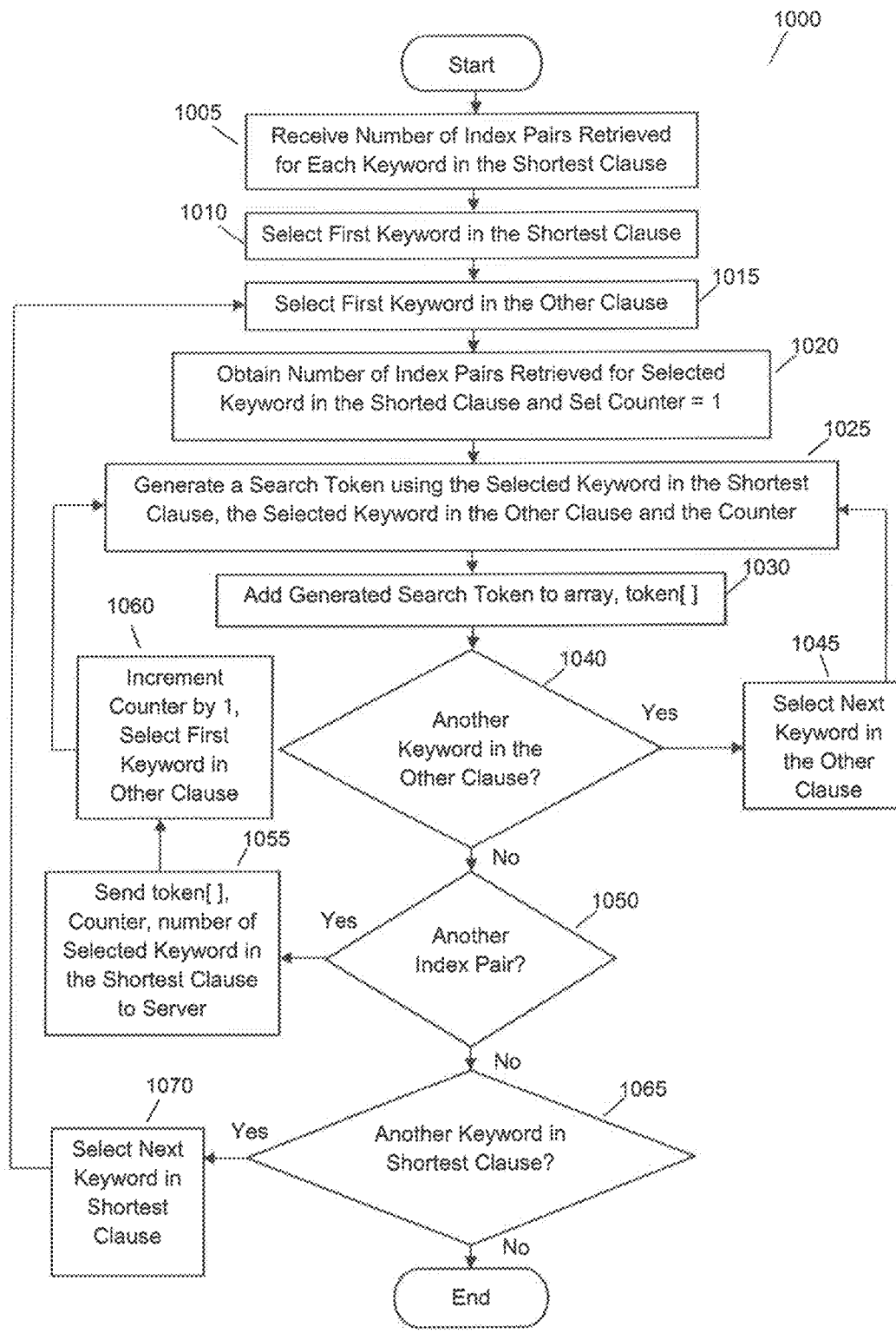
FIG. 10 illustrating a flow diagram of a process for generating search tokens for keyword permutations where each search token comprises a keyword from the shortest clause and a keyword obtained from other clauses in the conjunctive keywords in accordance with embodiments of the invention.

FIG. 10 illustrates process 1000 that is performed by a computer system to compute search tokens for keywords in the remaining clauses after the shortest clause without a NOT operator has been selected from the queried conjunctive keywords in accordance with embodiments of this invention. Process 1000 begins in step 1005 with process 1000 receiving the total number of index pairs that have been retrieved for each keyword in the shortest clause. At step 1010, process 1000 selects the first keyword in the shortest clause. Process 1000 then selects the first keyword from another clause in the queried conjunctive keywords at step 1015. Process 1000 then acquires the number of index pairs that have been retrieved for the selected keyword from the shortest clause and goes on to initialize a counter to track the search tokens that are generated for each retrieved index pair. When the process is first initialized, the value of the counter is set as 1. This occurs at step 1020. A search token for a first retrieved index pair (i.e. counter=1), the selected keyword from the shortest clause and the selected keyword from the other clause is then generated at step 1025. The generated search token is then added to array token [ ] at step 1030. Process 1000 then determines at step 1040 whether there is another keyword in the other clauses. If there is still another keyword in the other clauses, process 1000 proceeds to step 1045 whereby process 1000 selects the next keyword in the other clauses. Process 1000 then returns to step 1025 where a search token for a first retrieved index pair (i.e. counter=1), the selected keyword from the shortest clause and the newly selected keyword from the other clause is then generated. Process 1025 to 1045 repeats until all the keywords in the other clauses have been selected. Once process 1000 determines at step 1040 that there are no more keywords in the other clauses to be selected, process 1000 proceeds to step 1050.

At step 1050, process 1000 determines whether there is another index pair that has been retrieved for the selected keyword from the shortest clause. If process 1000 determines that there is another index pair that has been retrieved for the selected keyword from the shortest clause, process 1000 proceeds to step 1055. At step 1055, process 1000 transmits array token[ ], the number of the selected keyword in the shortest clause to the server to be further processed. Process 1000 then proceeds to step 1060 whereby the value of counter is incremented by 1 and process 1000 proceeds to select the first keyword from the other clauses. This would mean that process 1000 is now going to generate search tokens for the next index pair that has been retrieved for the selected keyword from the shortest clause. Process 1000 then returns to step 1025 where a search token for the next retrieved index pair (i.e. counter=2), the selected keyword from the shortest clause and the selected keyword from the other clause, which has been reset to the first keyword, is then generated. Processes 1055 to 1050 repeats until process 1000 determines at step 1050 that there are no other index pairs that have been retrieved for the selected keyword from the shortest clause.

Process 1000 then proceeds to step 1065. At step 1065, process 1000 determines whether there is another keyword in the shortest clause. If process 1000 determines that there is another keyword in the shortest clause, process 1000 then proceeds to step 1070 else process 1000 ends. At step 1070, process 1000 will then proceed to select the next keyword in the shortest clause. Process 1000 then returns to step 1015 whereby the search token generation process is then repeated for the selected keyword from the shortest clause. Processes 1070 to 1065 repeats until process 1000 determines at step 1065 that there are no other keywords in the shortest clause. Process 1000 then ends.

Figure 11:
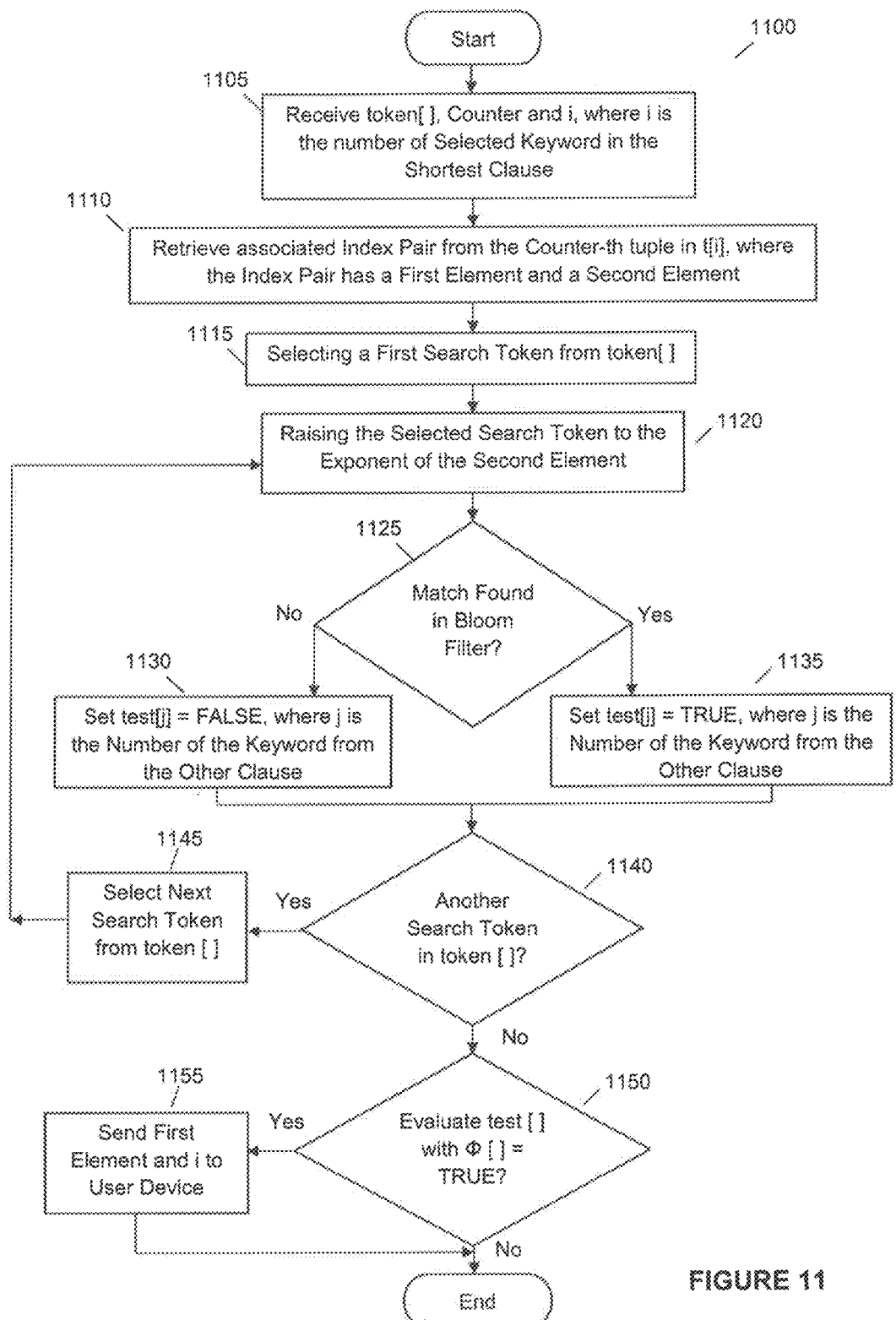
FIG. 11 illustrating a flow diagram of a process for determining whether a queried conjunctive keyword is present in the encrypted database using a search token generated in FIG. 10 in accordance with embodiments of the invention.

FIG. 11 illustrates process 1100 that is performed by a computer system to determine whether a queried conjunctive keyword is present in the encrypted database using search tokens that were generated by the processes described in FIG. 10. Process 1100 begins in step 1105 by receiving array token[ ], the value of counter and i, where i is the number of the presently selected keyword in the shortest clause. At step 1110, process 1100 then retrieves the relevant index pair from array t[i], i.e. the counter-th index pair in t[i], and where t[i] corresponds to the retrieved index pairs for the $i^{th}$ keyword in the shortest clause. At this stage, it would be useful to recall that each index pair comprises of two elements, a first element "e" and a second element "y". Process 1100 then proceeds to select the first search token from array token[ ] at step 1115. The selected search token is then raised to the exponent of the second element of the index pair, i.e. y. Process 1100 then compares the result of step 1115 with the elements contained in the Bloom filter. If a match is found, process 1100 proceeds to step 1135 where array test[j] is set as TRUE and where j is the number of the keyword obtained from the other clauses in the queried conjunctive keywords. Process 1100 then proceeds to step 1140. Alternatively, if a match is not found, process 1100 proceeds to step 1130 where array test[j] is set as FALSE and where j is the number of the keyword obtained from the other clauses in the queried conjunctive keywords. Process 1100 then proceeds to step 1140.

At step 1140, process 1100 determines whether there is another search token in array token[ ]. If there is another search token in token[ ], process 1100 proceeds to step 1145. At step 1145, process 1100 will select the next search token in token[ ] and then proceeds to step 1120 whereby this newly selected search token will be raised to the exponent of the second element of the index pair, i.e. y. Process 1145 to 1140 will keep repeating until there are no more search tokens in array token[ ]. Process 1100 will then proceed to step 1150.

At step 1150, the array test[ ] will be evaluated with the array Φ[ ]. To recap, array Φ[ ] contains all the operators from the remaining clauses. For example, if test[ ] comprises {FALSE, FALSE, TRUE} and if array Φ[ ] comprises {OR, OR}, when these two arrays are evaluated, this would result in a TRUE result, because (FALSE or FALSE or TRUE)= TRUE. If step 1150 returns a TRUE result, process 1100 will progress to step 1155 where the first element of the index pair, i.e. "e", will be transmitted to the user device. Process 1100 then ends. Alternatively, if step 1150 returns a FALSE result, process 1100 will then end.

Figure 12:
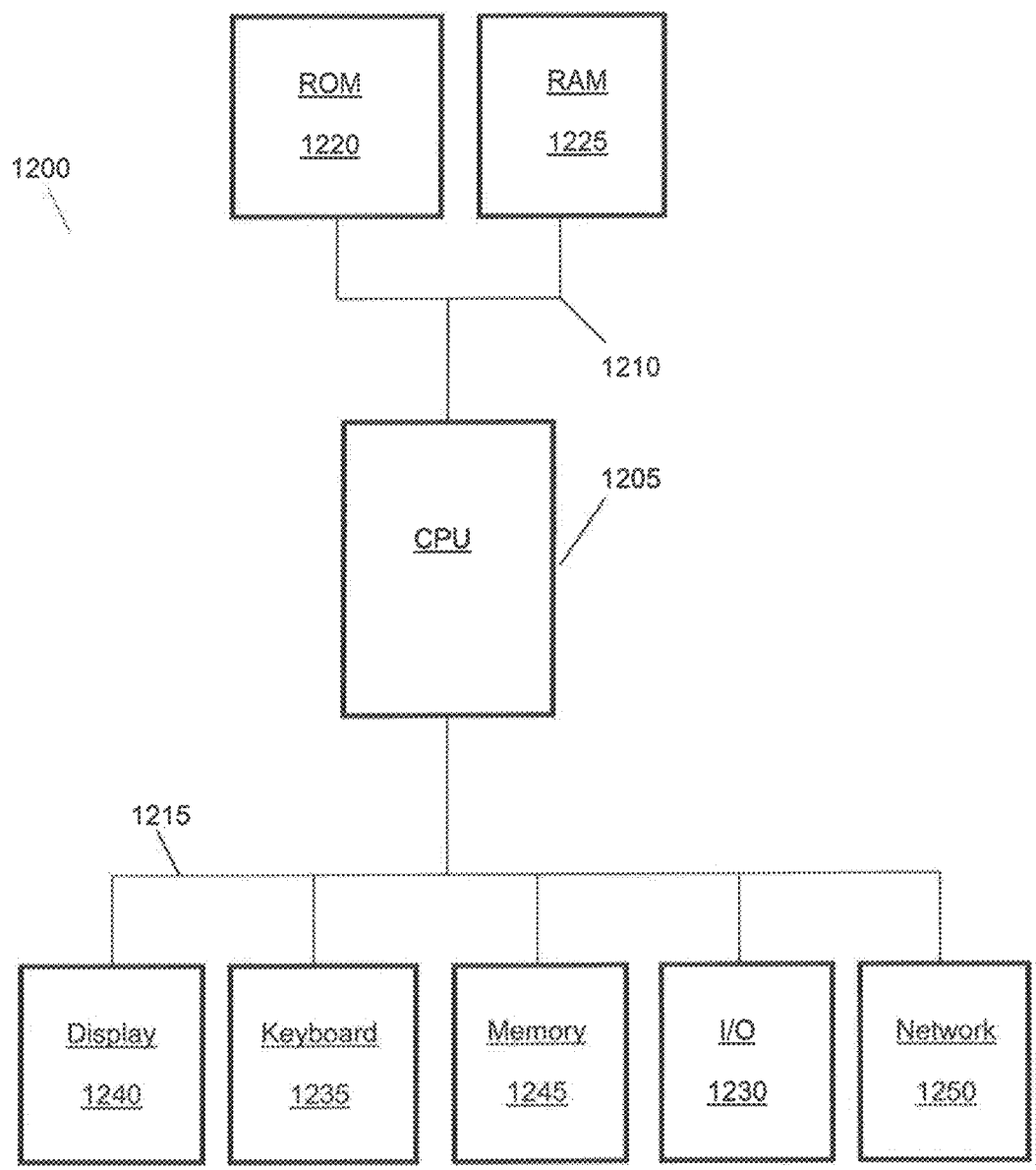
FIG. 12 illustrating a block diagram representative of processing systems providing embodiments in accordance with embodiments of the invention.

Processes provided by instructions stored in a media are executed by a processing unit in a computer system. A computer system may be provided in one or more mobile devices and/or computer servers to provide this invention. The instructions may be stored as firmware, hardware, or software. FIG. 12 illustrates an example of such a processing system. Processing system 1200 may be the processing system in the mobile devices and/or servers that execute the instructions to perform the processes for providing a method and/or system in accordance with embodiments of this invention. One skilled in the art will recognize that the exact configuration of each processing system may be different and the exact configuration of the processing system in each mobile device may vary and FIG. 12 is given by way of example only.

Processing system 1200 includes Central Processing Unit (CPU) 1205. CPU 1205 is a processor, microprocessor, or any combination of processors and microprocessors that execute instructions to perform the processes in accordance with the present invention. CPU 1205 connects to memory bus 1210 and Input/Output (I/O) bus 1215. Memory bus 1210 connects CPU 1205 to memories 1220 and 1225 to transmit data and instructions between memories 1220, 1225 and CPU 1205. I/O bus 1215 connects CPU 1205 to peripheral devices to transmit data between CPU 1205 and the peripheral devices. One skilled in the art will recognize that I/O bus 1215 and memory bus 1210 may be combined into one bus or subdivided into many other busses and the exact configuration is left to those skilled in the art.

A non-volatile memory 1220, such as a Read Only Memory (ROM), is connected to memory bus 1210. Non-volatile memory 1220 stores instructions and data needed to operate various sub-systems of processing system 1200 and to boot the system at start-up. One skilled in the art will recognize that any number of types of memory may be used to perform this function.

A volatile memory 1225, such as Random Access Memory (RAM), is also connected to memory bus 1210. Volatile memory 1225 stores the instructions and data needed by CPU 1205 to perform software instructions for processes such as the processes required for providing a system in accordance with embodiments of this invention. One skilled in the art will recognize that any number of types of memory may be used as volatile memory and the exact type used is left as a design choice to those skilled in the art.

I/O device 1230, keyboard 1235, display 1240, memory 1245, network device 1250 and any number of other peripheral devices connect to I/O bus 1215 to exchange data with CPU 1205 for use in applications being executed by CPU 1205. I/O device 1230 is any device that transmits and/or receives data from CPU 1205. Keyboard 1235 is a specific type of I/O that receives user input and transmits the input to CPU 1205. Display 1240 receives display data from CPU 1205 and display images on a screen for a user to see. Memory 1245 is a device that transmits and receives data to and from CPU 1205 for storing data to a media. Network device 1250 connects CPU 1205 to a network for transmission of data to and from other processing systems.

The above is a description of embodiments of a system and process in accordance with the present invention as set forth in the following claims. It is envisioned that others may and will design alternatives that fall within the scope of the following claims.

The invention claimed is:

1. A method for querying a symmetrically encrypted database for conjunctive keywords comprising:
   symmetrically decrypting the encrypted database and associating each keyword from the decrypted database with a file identity;
   generating an encrypted index table using keywords from the decrypted database, the encrypted index table comprising symmetrically encrypted keywords and their associated index pairs, wherein each encrypted keyword that is encrypted using secret key $K_T$ is associated with at least an index pair, and wherein each index pair comprises an e parameter and a y parameter;
   populating a Bloom filter with elements that each contain a symmetrically encrypted keyword from the encrypted database and a symmetrically encrypted file identity that is associated with the keyword;
   receiving queried conjunctive keywords, wherein the queried conjunctive keywords comprises at least one disjunction;
   selecting a shortest clause from the conjunctive keywords, wherein the shortest clause is a disjunction;
   generating trapdoors for all keywords contained in the selected shortest clause and retrieving corresponding index pairs for the keywords from the encrypted index table using the generated trapdoors;
   computing a group of search tokens for each of the keywords in the shortest clause wherein each group of search tokens is associated with an index pair retrieved for a keyword from the selected shortest clause and with keywords from other clauses in the conjunctive keywords;
   determining that the conjunctive keyword permutations are available in the encrypted database by evaluating a group of computed search tokens with operators contained in the other clauses; and
   generating a decryption key for a keyword from the shortest clause that is associated with the group of computed search tokens using the following equation:

$$K_E = F(K_S, q_i)$$

where $q_i$ is the $i^{th}$ selected keyword from the shortest clause, Ks is a secret key and F is a pseudorandom function; and
   decrypting an e parameter using the following equation to obtain a file identity associated with the queried conjunctive keywords:

$$\text{file ID} = \text{Dec}(K_E, e)$$

where file ID is the file identity associated with $q_i$ and Dec is a symmetric decryption function.

2. The method according to claim 1 wherein the e parameter in the index table is calculated using the following equation:

$$e = \text{Enc}(K_E, \text{file ID})$$

where $K_E = F(K_S, w_i)$, F is a pseudorandom function, $w_i$ represents a keyword from the database, file ID is a file identity associated with $w_i$, $K_s$ is a secret key and Enc is a symmetric encryption function.

3. The method according to claim 1 wherein the y parameter in the index table is calculated using the following equation:

$$y = \frac{xid_{fileID}}{F_P(K_Z, w_i \| c)}$$

where $xid_{file\ ID} = F_P(K_{ID}, \text{file ID})$, $F_p$ is a pseudorandom function, $K_Z$ and $K_{ID}$ are secret keys, $w_i$ represents a keyword from the database, file ID is a file identity associated with $w_i$, and c is a counter to track the number of index pairs created for $w_i$.

4. The method according to claim 1 wherein each element in the Bloom Filter is defined by the following equation:

$$g^{F_p(K_x, w_i) \cdot xid_{file\ ID}}$$

where $xid_{file\ ID} = F_p(K_{ID}, \text{file ID})$, $F_p$ is a pseudorandom function, $K_x$ and $K_{ID}$ are secret keys, $w_i$ represents a keyword from the database, and file ID is a file identity associated with $w_i$.

5. The method according to claim 1 wherein the computing the group of search tokens for each of the keywords in the shortest clause comprises computing each search token using the following equation:

$$\text{token}[c][j] = g^{F_P(K_x, q_j) \cdot F_p(K_z, q_i \| c) \cdot y}$$

where $q_j$ is the $j^{th}$ selected keyword from the other clauses, $q_i$ is the $i^{th}$ selected keyword from the shortest clause, c is a counter showing the number of an index pair retrieved for $q_i$; j is the number of the selected keyword from the other clauses, $F_p$ is a pseudorandom function, $K_x$, $K_Z$ are secret keys and y is a parameter obtained from the selected index pair.

6. The method according to claim 1 wherein the generating of trapdoors for all keywords contained in the selected shortest clause comprises:
   encrypting each keyword in the shortest clause using secret key $K_T$.

7. The method according to claim 1 wherein the determining that the conjunctive keyword permutations are available in the encrypted database by evaluating a group of computed search tokens with operators contained in the other clause comprises:
   creating a test array for storing an array of TRUE or FALSE results;
   comparing each search token from the computed group of search tokens with elements contained in the Bloom filter to determine whether there is a match, and populating the test array with the results from the comparison;
   evaluating the populated test array with an operator array, wherein the operator array contains operators from the other clauses; and
   providing a positive or negative result depending on the evaluation outcome.

8. A system for querying a symmetrically encrypted database for conjunctive keywords comprising:
a processing unit; and
a non-transitory media readable by the processing unit, the media storing instructions that when executed by the processing unit, cause the processing unit to:
decrypt the encrypted database and associate each keyword from the decrypted database with a file identity;
generate an encrypted index table using keywords from the decrypted database, the encrypted index table comprising symmetrically encrypted keywords and their associated index pairs, wherein each encrypted keyword that is encrypted using secret key $K_T$ is associated with at least an index pair, and wherein each index pair comprises an e parameter and a y parameter;
populate a Bloom filter with elements that each contain a symmetrically encrypted keyword from the encrypted database and a symmetrically encrypted file identity that is associated with the keyword;
receive queried conjunctive keywords, wherein the queried conjunctive keywords comprises at least one disjunction in the query;
selecting a shortest clause from the conjunctive keywords, wherein the shortest clause is a disjunction;
generate trapdoors for all keywords contained in the selected shortest clause and retrieving corresponding index pairs for the keywords from the encrypted index table using the generated trapdoors;
compute a group of search tokens for each of the keywords in the shortest clause wherein each group of search tokens is associated with an index pair retrieved for a keyword from the selected shortest clause and with keywords from other clauses in the conjunctive keywords;
determine that the conjunctive keyword permutations are available in the encrypted database by evaluating a group of computed search tokens with operators contained in the other clauses; and
generate a decryption key for a keyword from the shortest clause that is associated with the group of computed search tokens using the following equation:

$$K_E = F(K_S q_i)$$

where qi is the ith selected keyword from the shortest clause, Ks is a secret key and F is a pseudorandom function; and
decrypt an e parameter using the following equation to obtain a file identity associated with the queried conjunctive keywords:

$$\text{file ID} = \text{Dec}(K_E, e)$$

where file ID is the file identity associated with qi and Dec is a symmetric decryption function.

9. The system of claim 8 wherein the instructions to generate the encrypted index table comprise:
instructions for directing the processing unit to:
compute the e parameter in the index table using the following equation:

$$e = \text{Enc}(K_E, \text{file ID})$$

where $K_E = F(K_S, W_i)$, F is a pseudorandom function, $w_i$, represents a keyword from the database, file ID is a file identity associated with $w_i$, $K_s$ is a secret key and Enc is a symmetric encryption function.

10. The system of claim 8 wherein the instructions to generate the encrypted index table comprise:
instructions for directing the processing unit to:
compute the y parameter in the index table using the following equation:

$$y = \frac{xid_{fileID}}{F_P(K_Z, w_i \| c)}$$

where $xid_{file\ ID} = F_P(K_{ID}, \text{file ID})$, $F_p$ is a pseudorandom function, $K_z$ and $K_{ID}$ are secret keys, $w_i$, represents a keyword from the database, file ID is a file identity associated with $w_i$ and c is a counter to track the number of index pairs created for $w_i$.

11. The system of claim 8 wherein the instructions to populate the Bloom Filter comprise:
instructions for directing the processing unit to:
compute each element in the Bloom Filter using the following equation:

$$g^{F_P(K_x, w_i) \cdot xid_{file\ ID}}$$

where $xid_{file\ ID} = F_P(K_{ID}, \text{file ID})$, $F_p$ is a pseudorandom function, $K_x$ and $K_{ID}$ are secret keys, $w_i$, represents a keyword from the database, and file ID is a file identity associated with $w_i$.

12. The system of claim 8 wherein the instructions to compute the group of search tokens for each of the keywords in the shortest clause comprise:
instructions for directing the processing unit to:
compute each search token using the following equation:

$$\text{token}[c][j] = g^{F_P(K_x, q_j) \cdot F_P(K_z, q_i \| c) \cdot y}$$

where $q_j$ is the $j^{th}$ selected keyword from the other clauses, q, is the $i^{th}$ selected keyword from the shortest clause, c is a counter showing the number of an index pair retrieved for $q_i$; j is the number of the selected keyword from the other clauses, $F_p$ is a pseudorandom function, $K_x$, $K_z$ are secret keys and y is a parameter obtained from the selected index pair.

13. The system of claim 8 wherein the instructions to generate trapdoors for all keywords contained in the selected shortest clause comprise:
instructions for directing the processing unit to:
encrypt each keyword in the shortest clause using secret key $K_T$.

14. The system of claim 8 wherein the instructions to determine that the conjunctive keyword permutations are available in the encrypted database by evaluating a group of computed search tokens with operators contained in the other clause comprise:
instructions for directing the processing unit to:
create a test array for storing an array of TRUE or FALSE results;
compare each search token from the computed group of search tokens with elements contained in the Bloom filter to determine whether there is a match, and populating the test array with the results from the comparison;
evaluate the populated test array with an operator array, wherein the operator array contains operators from the other clauses; and
provide a positive or negative result depending on the evaluation outcome.

15. The method according to claim 1, wherein the shortest clause is without a NOT operator.

16. The system of claim 8, wherein the shortest clause is without a NOT operator.

* * * * *